United States Patent [19]

Gneiss et al.

[11] Patent Number: 4,549,433
[45] Date of Patent: Oct. 29, 1985

[54] DEVICE FOR MEASURING THE MASS OF A FLOWING MEDIUM

[75] Inventors: Heinz Gneiss, Ludwigsburg; Jaihind S. Sumal, Vaihingen; Werner Wünsch, Markgröningen, all of Fed. Rep. of Germany

[73] Assignee: Robert Bosch GmbH, Stuttgart, Fed. Rep. of Germany

[21] Appl. No.: 617,057

[22] Filed: May 29, 1984

[30] Foreign Application Priority Data

Aug. 10, 1983 [DE] Fed. Rep. of Germany ....... 3328853

[51] Int. Cl.$^4$ .............................................. G01F 1/68
[52] U.S. Cl. ........................................ 73/204; 338/25; 338/313; 338/318
[58] Field of Search ............... 73/204; 338/306, 308, 338/313, 318, 25

[56] References Cited

U.S. PATENT DOCUMENTS

| 1,900,206 | 3/1933 | Silberstein | 338/318 |
| 2,003,625 | 6/1935 | Boyer | 338/318 X |
| 3,900,819 | 8/1975 | Djorup | 73/204 X |
| 4,396,899 | 8/1983 | Ohno | 338/308 |

FOREIGN PATENT DOCUMENTS 0095265  6/1983  Japan ..................................... 73/204

Primary Examiner—Herbert Goldstein
Attorney, Agent, or Firm—Edwin E. Greigg

[57] ABSTRACT

A device for measuring the mass of a flowing medium. The device includes a flat carrier to which at least one resistor layer is applied. Electrical conductor connections extending in alignment with one another are fixed on one end, with ends in elastic holder bodies and oriented with ends toward the carrier. On the other end, the ends of the electrical conductor connections rest with support segments each on one end face of the carrier and with fastening segments partially encompassing and gripping the carrier. The fastening segments are soldered or welded to a connecting layer or directly to the temperature-dependent resistor. As a result, the soldered or welded connection is held in a flexion-free and thrust-free manner on the fastening segments.

6 Claims, 3 Drawing Figures

DEVICE FOR MEASURING THE MASS OF A FLOWING MEDIUM

BACKGROUND OF THE INVENTION

The invention is based on a device for measuring the mass of a flowing medium, or flow rate meter. A flow rate meter is already known in which there is a danger that flexion and thrusting forces, especially when the heated temperature-dependent resistor warms up, may damage or even destroy the soldered connection between the electrical connections and the temperature-dependent resistor, thereby causing the device to fail.

OBJECT AND SUMMARY OF THE INVENTION

The device according to the invention has the advantage over the prior art that the electrically conductive connection effected by welding or soldering between the electrical connections and the electrically conductive layers on the carrier is free from flexion and thrust, and the carrier is subjected only to pressure.

By means of the characteristics disclosed advantageous further embodiments of and improvements to the device disclosed are possible. A particular advantage is attained by embodying a claw-like fastening segment of each electrical connection in the shape of a U, so that they can partially encompass and grip the carrier on both sides and connect two resistors. It is also advantageous for the electrical connections to be embodied directly on holder bodies. A still further advantage is attained by fixing the electrical connections remote from the carrier, in fastening openings of elastic holder bodies; the holder bodies may be manufactured from electrically conductive material.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
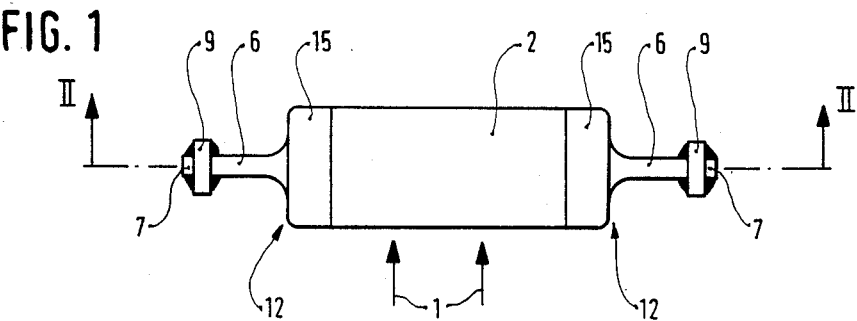
FIG. 1 shows a first exemplary embodiment of a device according to the invention for measuring the mass of a flowing medium.
Figure 2:
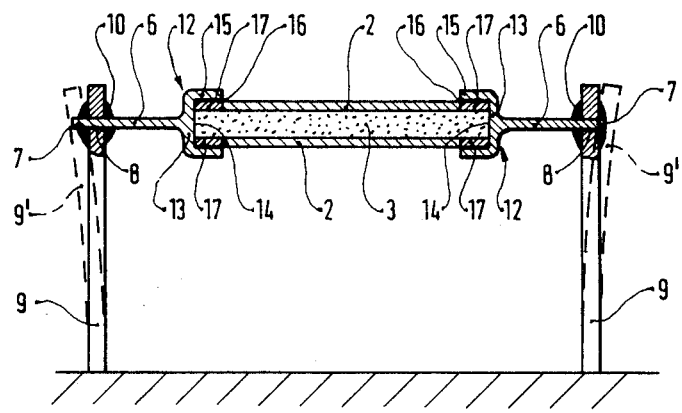
FIG. 2 is a sectional view taken along the line II—II of FIG. 1.

As shown in FIGS. 1 and 2, at least one temperature-dependent resistor 2 in the form of a film or a coating applied to a carrier 3, which is shown as a rectangular shaped embodiment, disposed in the flow of a medium indicated by the arrow 1 and serves to measure the mass of that medium. The temperature-dependent resistor 2 is supplied to this end with electric current in a known manner by an electronic regulating circuit, not shown, in such a way that the resistor 2 assumes a constant temperature. When such a device is used for measuring the mass of air aspirated by an internal combustion engine, the device must meet very exacting demands in terms of the speed and accuracy of measurement and the service life of the device, because on the one hand with rapidly changing masses of air these changes in the air mass must be detected as quickly as possible by the device so that the fuel quantity to be supplied can be adapted properly, and on the other hand the service life and functional longevity of the device must at least equal the service life of the fuel supply system of the engine. To meet the stringent demands for measuring accuracy and speed, it is therefore suitable to keep the heat-absorption property of the carrier 3 and the temperature-dependent resistor 2 as low as possible and furthermore to provide that as little heat as possible is carried away via the support of the carrier 3 and the temperature-dependent resistor 2, so that the response time to changes in the flow rate of the medium is as short as possible. According to the invention, the carrier 3 having the temperature-dependent resistor 2 thereon, may be disposed extending in the flow direction 1 on both sides of the carrier 3, and should therefore be supported in the flow medium by means of rigid electrical conductor connections 6. To this end, the electrical conductor connections 6 may be disposed on holder bodies 9 in a manner not shown, or the electrical conductor connections 6 may protrude, with wirelike ends 7 beyond the carrier, through fastening openings 8 in holder bodies 9 and be fixed there, for instance by means of soldered or welded connections 10. The holder bodies 9 which are supported on the other end by attachment to the housing should be made of a flexible material so that they are capable of bending in accordance with the forces transmitted by means of the electrical conductor connections 6. Furthermore the holder bodies 9 may be manufactured of flexible, electrical, conductive material, so that the electrical contact with the electrical conductor connections 6 can be made by way of the holder bodies 9. The electrical conductor connections 6 are oppositely disposed in alignment with one another, and their ends 12 oriented toward the carrier 3 are formed with at least upper and lower opposing support segments 13 which grip respective end faces 14 of the carrier 3. Communicating with the opposing support segments 13 is at least one fastening segment 15 angled in claw-like fashion, which may also be U-shaped in embodiment and then extends at both sides, onto the carrier 3. Each fastening segment 15 can either be directly connected electrically with the temperature-dependent resistor 2, for instance by a soldered or welded connection 16, or it may be connected by a soldered or welded connection 16 with an electrically conductive connecting layer 17, which is applied to the carrier 3 near each end face 14 and is connected in an electrically conductive manner with the temperature-dependent resistor 2. Communication between the two temperature-dependent resistors 2 is established by the U-shaped embodiment of the fastening segment 15.

Now if the temperature-dependent resistor 2 is electrically heated, then the carrier 3 increases in length and the electrical conductor 6 are moved in opposite directions from one another toward the holder bodies 9 and bend or flex these holder bodies into positions such as are shown in dashed lines at 9'. In this process, however, no forces of flexion or thrust are exerted at the soldered or welded connection 16 of the fastening segments 15; only pressure forces are exerted, via the support segments 13, upon the carrier 3. A long service life for the soldered or welded connections 16 is thereby assured.

In a further embodiment, the flexible embodied holder bodies 9 may already be connected with an initial stress with the ends 7 of the electrical conductor connections 6 when the electrical connections 6 are assembled, in that the holder bodies 9 are held, during the soldering or welding process, in the position shown in dashed lines and marked 9'. As a result, a certain pressure force is exerted continuously by the electrical connections 6 upon the end faces 14 of the carrier 3.

Figure 3:
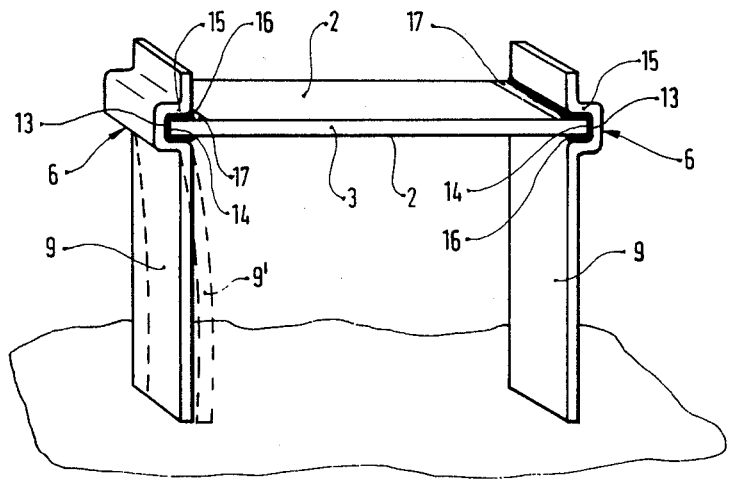
FIG. 3 shows a second exemplary embodiment of a device according to the invention for measuring the mass of a flowing medium.

In the exemplary embodiment shown in FIG. 3, elements remaining the same and functioning the same as those in the exemplary embodiment of FIGS. 1 and 2 are again identified by the same reference numerals. In the exemplary embodiment according to FIG. 3, the electrical conductor connections 6 are formed directly on the holder bodies 9, 9' by deforming a portion of the holder bodies 9, 9', for instance into the shape of a U. Thus each support segment 13 of each electrical conductor connection 6 rests on one end face 14 of the carrier 3, and fastening segments 15 extending virtually parallel to the carrier 3 are connected in an electrically conductive manner to the connecting layers 17 applied to carrier 3 or directly to the temperature-dependent resistor layers 2. Since in the exemplary embodiment according to FIG. 3, the electric conductor connections 6 are provided directly on the holder bodies 6, 6', the expense is less than that for the exemplary embodiment according to FIGS. 1 and 2.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A device for measuring the mass of a flowing medium, comprising a substantially rectangular carrier body, at least one temperature-dependent resistor layer of electrically conductive material on said carrier body, said at least one temperature-dependent
resistor layer disposed in the flow path of the medium to be measured, at least two oppositely disposed electrical conductor connections in alignment with one another and secured at one end to a different end face of the carrier body in electrical contact with said at least one temperature-dependent resistor and supported at one end by a holder body, in which each of said electrical conductor connections are oriented toward the carrier body and each electrical conductor connection has at least one fastening segment which extends onto an end of said carrier, each said fastenting segment of each electrical conductor connection, is embodied in the shape of a U, and partially encompasses and grips the carrier body on both sides of each end of said carrier body, an electrically conductive layer electrically conductively connected with said electrical conductor connection and the temperature-dependent resistor layer, and the fastening segment of each electrical conductor connection is soldered to the electrically conductive layer.

2. A device as defined by claim 1, in which the holder bodies are mounted such that they exert a force upon the electrical conductor connections in the direction toward the carrier body.

3. A device as defined by claim 1, in which the holder bodies are electrically conductive.

4. A device for measuring the mass of a flowing medium in a housing, comprising a substantially rectangular carrier body, at least one temperature-dependent resistor layer of electrically condutive material on said carrier body, said at least one temperature-dependent resistor layer disposed in the flow path of the medium to be measured, at least two oppositely disposed electrical conductor connections in alignment with one another and secured to a different end face of the carrier in electrical contact with said at least one temperature-dependent resistor, in which each of said electrical conductor connections are oriented toward the carrier and each electrical conductor connection has at least one fastening segment which extends onto an end of said carrier, each said fastening segment of each electrical conductor connection, is embodied in the shape of a U, and partially encompasses and grips the carrier on both sides of each end of said carrier body, an electrically conductive layer is electrically conductively connected with said electrical conductor connection and the temperature-dependent resistor layer and the fastening segment of each electrical conductor connection is soldered to the electrical conductive layer, and each electrical conductor connection is supported at one end by one end of a holder body which is supported by said housing on an opposite end thereof, and an end of said electrical conductor connection remote from the carrier extends into a fastening opening through said holder body to which said end of said electrical conductor connection remote from said carrier is secured.

5. A device as defined by claim 4, in which the holder bodies are mounted such that they exert a force upon the electrical conductor connections in the direction toward the carrier body.

6. A device as defined by claim 4, in which the holder bodies are electrically conductive.

* * * * *